United States Patent [19]

Kahn

[11] Patent Number: 5,056,895
[45] Date of Patent: Oct. 15, 1991

[54] ACTIVE MATRIX LIQUID CRYSTAL LIQUID CRYSTAL LIGHT VALVE INCLUDING A DIELECTRIC MIRROR UPON A LEVELING LAYER AND HAVING FRINGING FIELDS

[75] Inventor: Frederic J. Kahn, Palo Alto, Calif.

[73] Assignee: Greyhawk Systems, Inc., Milpitas, Calif.

[21] Appl. No.: 527,753

[22] Filed: May 21, 1990

[51] Int. Cl.[5] .............................................. G02F 1/13
[52] U.S. Cl. ......................................... 359/87; 359/71; 359/74; 359/84
[58] Field of Search ................... 350/338, 331 R, 334, 350/336, 339 R

[56] References Cited

U.S. PATENT DOCUMENTS

| | | | |
|---|---|---|---|
| 3,806,897 | 4/1974 | Buchan et al. | 350/393 X |
| 4,519,618 | 5/1985 | Komatsubara et al. | 350/338 |
| 4,542,960 | 9/1985 | Yang | 350/336 |
| 4,662,719 | 5/1987 | Di Maria et al. | 350/332 |
| 4,744,639 | 5/1988 | Tsuboyama et al. | 350/350 S |
| 4,852,976 | 8/1989 | Suzuki | 350/339 R |
| 4,999,619 | 3/1991 | Te Velde | 350/333 X |

*Primary Examiner*—Stanley D. Miller
*Assistant Examiner*—Ron Trice
*Attorney, Agent, or Firm*—Flehr, Hohbach, Test, Albritton & Herbert

[57] ABSTRACT

An active matrix liquid crystal light valve is disclosed. The addressing matrix has an array of electrodes to create electric fields across the liquid crystal layer. The light valve has a continuous nonconductive reflector layer, separate and distinct from the electrode array of the active matrix. This light valve has a leveling layer disposed on the active matrix to form a planar surface. The reflector layer is formed as a continuous sheet on the planar surface of the leveling layer. An additional invention is the use of fringing fields to switch substantially all of the liquid crystal, including areas not directly over the electrodes.

21 Claims, 7 Drawing Sheets

OPTICAL SYSTEM

FIG.—6

ACTIVE MATRIX LIQUID CRYSTAL LIQUID CRYSTAL LIGHT VALVE INCLUDING A DIELECTRIC MIRROR UPON A LEVELING LAYER AND HAVING FRINGING FIELDS

BACKGROUND OF INVENTION

1. Field of Invention

The present invention relates to an active matrix liquid crystal light valve. More specifically, the present invention relates to a high aperture ratio active matrix liquid crystal light valve which operates in a reflective mode, which modulates the polarization of incident light, and which produces very bright, high contrast ratio projected images.

2. Summary of Prior Art

Spatial light modulators consisting of a liquid crystal layer which is addressed by an active matrix of electronic elements can be used to modulate light. Active matrix liquid crystal light valve cells (hereafter simply referred to as either as cells or light valves, without mention of the addressing matrix) are undergoing extensive commercial development primarily driven by the desired use as direct view displays for commercial television applications and personal computing products. Direct view displays are ones in which the cell itself is viewed, as opposed to projection displays, in which the image projected from the cell is viewed. The direct view displays generally use transmissive rather than reflective light valves. Transmissive light valves allow backlighting for improved contrast, color quality, and visibility in low ambient light. Less development effort has been applied to projection cells, and the work that has been done tends to leverage off the intense development of direct view displays. As a result, prior art light valves developed for projection displays have certain deficiencies.

Two of the most important properties of projection displays are luminance and contrast ratio. High luminance is required in order to provide images which are not washed out by ambient light. High contrast ratio is required for good greyscale and color tones (a contrast ratio of 100:1 is needed for faithful reproduction of the full range of observable greyscale tones). Aperture ratio and contrast ratio are more critical for projection devices than for direct view devices. Aperture ratio is the ratio of the light modulating area of the light valve to the total area of the light valve. For a given projection system, luminance will be directly proportional to the aperture ratio of the light valve. Because large optical elements are prohibitively expensive, the size of projection cells must generally be less than that of direct view cells in order to enable the use of small and low cost projection optics. Therefore, to achieve the same information content, a higher density of pixels is required on the cell. The higher pixel density results in a lower aperture ratio, because the area required for transistors, pixel isolation, and row and column leads is relatively constant. Typical aperture ratios of transmissive projection light valves are less than 50% for 240 line devices and less than 20% for 1000 line devices. Attempts to improve aperture ratio by making narrow leads and reducing pixel spacing typically reduce manufacturing yield and increase cost. Other approaches, such as utilizing optical elements as disclosed in U.S. patent application Ser. No. 480,270 by Zampolin et al., and assigned to the same assignee as the present invention, increase system complexity and therefore have a cost impact as well.

Prior art projection systems also generally utilize transmissive light valves because this enables them to be made on the same manufacturing lines as the direct view devices. Another benefit of transmissive projection light valves is simplified and hence lower cost projection optics. U.S. Pat. No. 4,764,390 by McKechnie et al., is an example of one projection system that utilizes transmissive light valves. However, there are numerous drawbacks in the use of transmissive light valves which can be avoided by using reflective light valves. Obviously, transmissive light valves must utilize transparent materials in the addressing matrix of electrodes. Glass substrates can provide a large area substrate at reasonable cost. In prior art the active matrix is composed of amorphous silicon (a-Si) or polycrystalline silicon (poly-Si). Amorphous silicon uses low temperature processing and thus can use a low cost glass substrate. Polycrystalline silicon uses a higher temperature processing, but the improved electrical properties of poly-Si allow integration of the matrix address and drive electronics on the same substrate.

A prior art reflective light valve fabricated using a-Si active matrix liquid crystal display technology on a glass substrate is revealed in "High Density Reflective Type TFT Array for High Definition Liquid Crystal Projection TV System" by Takubo et al., in JAPAN DISPLAY 1989 which uses a-Si Transistor Switches. The reflective electrodes of this array must be polished mechanically to obtain a mirror surface. This is an intrinsically time consuming and low yield process. Increased aperture ratio can be obtained because the TFTs and well as the row and column leads can be located under the reflector electrode and therefore do not have to increase the non modulating area. Even so, the quoted aperture ratio is limited to 70%.

Examination of prior art indicates that there are many problems with the use of a-Si and poly-Si circuits. The field effect mobility of a-Si (and hydrogenated a-Si) transistors is usually too low to integrate the drivers into a functional video device. Photoconduction, 200 times higher in a-Si than poly-Si, is a large problem in devices which use a-Si because they require special light shields or blockers. In poly-Si circuit devices, ordinary substrates cannot withstand the high temperature processing, and therefore fused quartz or a high-melting point glass is used instead of ordinary soda lime glass as substrate. These temperature resistant substrates are very expensive. Also, differences in thermal expansion coefficients can cause cracks in the recrystallized poly-Si layers. However, the most important problem with the prior art is that the fabrication of a-Si and poly-Si circuits on glass are not conventional integrated circuit processes and therefore require specialized manufacturing lines. This results in lower yields than could be achieved if the more mature process technology and equipment of conventional integrated circuit production lines were to be used. Furthermore, major investments, typically $30 million to $300 million or more, are required to develop and build specialized a-Si and poly-Si circuit production lines.

Production lines for direct view devices have been specialized, and modification of these lines for the production of the higher resolution and smaller area projection cells would be costly. Construction of specialized lines to produce projection cells would also be very expensive. A prior art alternative is active matrix light valves based on the use of silicon metal-on-oxide field effect transistors (MOS transistors) fabricated on a silicon monolithic wafer. MOS is mainstream integrated circuit technology, and the MOS manufacturing technology is mature. Because the silicon wafer is opaque, such devices are limited to reflective mode operation.

The prior art of reflective light valves using MOS technology is described in the book "Liquid Crystal TV Displays: Principles and Applications of Liquid Crystal Displays", by E. Kaneko (1986). The important problems discussed by Kaneko in this prior art are low aperture ratio, rough reflection electrode surfaces, nonplanar topographies, and interface reflections. As previously documented, low aperture ratio limits luminance. Rough surfaces can cause increased light scattering which limits contrast ratio. Non-planar topographies can limit the thickness tolerance of the liquid crystal layer and also produce contrast ratio reducing light scattering and spurious reflection. Very uniform liquid crystal layer tolerance is required for both high contrast ratio and high luminance. Finally, reflections from the counter electrode and its substrate also reduce contrast ratio.

Additional prior art, represented by U.S. Pat. No. 4,239,346 by Lloyd, presents a reflective light valve which utilizes MOS transistors and which operates in a scattering mode. In this device, the capacitor and drive lines are also placed beneath the reflective electrode. This prior art solves part of the problems of nonglanar topography by placing most of the reflective electrode above an insulating layer that also serves as a leveling layer and also provides higher aperture ratio than other cells in which the busses are coplanar with the electrodes. However, the reflective/conductive electrode still has an uneven surface and gaps between the electrodes which limit aperture ratio. Finally, the device has interface reflections which tend to reduce contrast ratio.

An additional problem in most prior art addressing matrices is the necessity of storage capacitors. The liquid crystal materials used for scattering mode operation must have relatively low resistivity. Consequently they have a low RC constant, and quickly discharge after removal of an applied field. The storage capacitors serve to increase the dielectric relaxation time until it is longer than a frame time, which is about 33 ms for a 2:1 interlaced 60 field/second video signal. The capacitors retain charge so that a steady field is applied across the liquid crystal for a duration up to a frame time, resulting in improved luminance and eliminating flicker. These capacitor layers add complexity and cost to the construction of the light valve.

OBJECTIVES OF INVENTION

It is an objective of the present invention to provide a high resolution, high contrast ratio, very high brightness projector in which the images are generated temporarily and spatially by at least one active matrix addressed liquid crystal light wave.

It is another objective of the present invention to provide a light valve which can be fabricated utilizing technology extant in the integrated circuit industry.

It is another objective of the present invention to provide a light valve which can be fabricated alone or in multiples on a conventional silicon wafer.

It is another objective of the present invention to provide a light valve in which interface reflections are reduced.

It is another objective of the present invention to provide a light valve in which additional storage capacitors are not required.

It is another objective of the present invention to provide a light valve in which the lead count and system cost is reduced by placing the drivers and matrix on the same substrate.

It is another objective of the present invention to provide a light valve which can achieve a substantially 100% aperture ratio.

SUMMARY OF INVENTION

The attainment of these and related objectives may be achieved through the use of the novel matrix addressed reflective liquid crystal light valve herein disclosed. A light valve in accordance with this invention has a semiconductor substrate upon which is formed an array of FET switches, each of which is electrically connected to an electrode, a leveling layer disposed on the electrodes, a dielectric mirror, a transparent substrate with transparent conductor, and, disposed between the dielectric mirror and the transparent conductor, liquid crystal which operates to modulate the polarization of incoming light.

DETAILED DESCRIPTION OF THE INVENTION

Figure 1A:
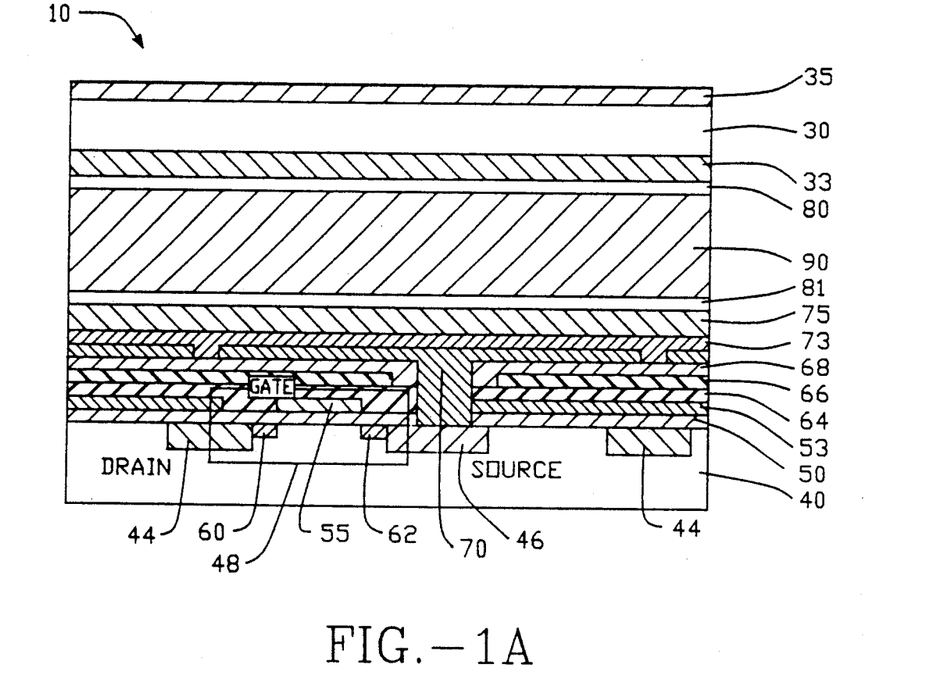
FIG. 1A is a cross section of the region around a single pixel of the matrix addressed liquid crystal cell of the preferred embodiment of the present invention.
Figure 1B:
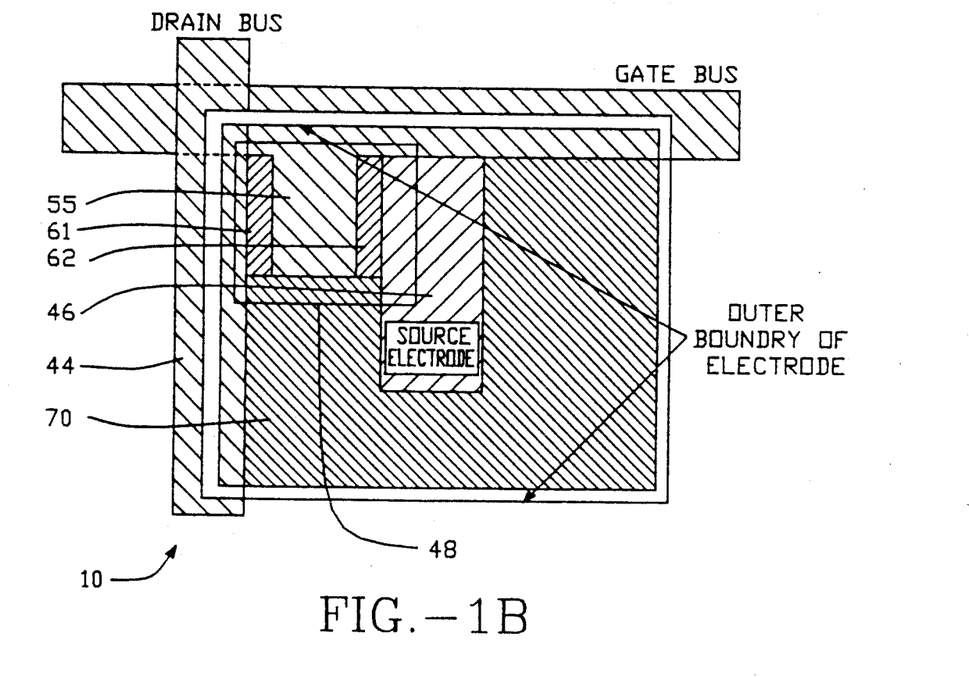
FIG. 1B is a top view of the same region as shown in FIG. 1A.

FIG. 1A is a cross-sectional view of a single pixel of a cell constructed according to the first embodiment of the present invention. FIG. 1B is a top view of the same pixel as shown in FIG. 1A. Referring now to FIG. 1A and FIG. 1B, the cell 10 is comprised of a large number of component layers. One exterior layer of the cell 10 is formed by transparent substrate 30. Transparent substrate 30 can be formed of glass. Deposited on transparent substrate 30 is electrode 33. Electrode 33 is a transparent conductor, usually composed of indium tin-oxide (ITO). The other side of transparent substrate 30 is coated with antireflective coating 35. Antireflective coating 35 acts to reduce interface reflections by methods well known in the art. Additional antireflection coatings may be advantageously positioned between layers 30 and 33 and between layers 33 and 80. The other exterior layer of the cell 10 is a semiconductor substrate 40.

Substrate 40 is preferably an n-type single crystal semiconductor silicon wafer which is suitable for standard integrated circuit processes that are well known in the art. Conventional processes, well known in the art, can be used to fabricate MOS transistors. By using conventional integrated circuit techniques, the cells can be fabricated singly or in multiples on the silicon wafer. There are many possible structures of addressing matrices, such as those described by Kaneko. The structure of the addressing matrix described herein is preferred, but is not necessary to the invention. The semiconductor substrate 40 is prepared with a plurality of highly P+ doped regions 44 and 46. These doped regions can be prepared by methods well known to those in the art. The dopant used to prepare P+ doped regions 44 and 46 could be Ge or As. P+ doped region 44 will define the drain electrode 44, and P+ doped region 46 will define the source electrode 46. Semiconductor substrate 40 is then covered with a thin silicon dioxide dielectric insulating layer 50. An additional oxide layer 53 covers the first oxide layer, except where it is etched away to define the gate electrode bus 55. Gate electrode bus 55 is composed of polysilicon or aluminum. The drain electrode bus 44, the source electrode 46, and the projection off of the gate electrode bus 55 define the field effect transistor (FET) structure 58. The function and operation of field effect transistor 58 is well known in the art. The FET structure 58 is aligned by means of an ion implantation step which define ion implants 60, 62. An additional insulating layer 64 of oxide is disposed on the entire cell encapsulating FET structure 58. It is possible to place multiple FETs in each pixel by methods well known in the art, and thereby increase manufacturing yield.

Positioned on oxide layer 64, except in the region of the source electrode 46, is capacitor structure 64. Capacitor structure 64 is a metal layer. Capacitor structure 64 can also function as a light blocking layer to protect the various doped regions. Capacitor structure 64 is covered by insulating oxide layer 68. The composition of oxide layers 50, 53, 64, 68, is well known in the art, and is preferably either $SiO_2$, $TaO_5$, or $Si_3N_4$. At various points in the fabricating process the oxide layers 50, 53, 64, 68 are etched in the region of the source 46. A layer of metal is deposited in the etched region and on insulating layer 68 to form the electrode 70. Electrode 70 is formed to create an voltage drop across the layers between it and transparent electrode 33. Electrode 70 is preferably rectangular, typically 20 to 80 μm on a side, and composed of Au? Each individual electrode is separated by a gap of approximately 6 μm. A benefit of this construction is that FET 58, drain bus 44, source 46, and gate bus 55 are located beneath electrode 70. Therefore the electrodes can cover substantially all of the cell area. This is a benefit because it enables substantially all of the liquid crystal to be electrical addressed.

Covering electrode 70 and the portions of insulating layer 65 still exposed, is insulative leveling layer 73. Leveling layer 73 is composed of a high resistivity polymer or spin-on-glass with good film forming properties and which adheres well to electrode 70. Leveling layer 73 is preferably composed of a polyimide material, because polyimides with high resistivity, low alkali metal concentrations, and good resistance to temperatures are readily available. Disposed on the leveling layer 73 is a reflector layer 75. Reflector layer 75 is preferably a dielectric mirror, but it could be an reflective layer which does not allow conduction over distances greater than one pixel. Dielectric mirror 75 is formed of multiple alternating layers of relatively high and low optical density, such as $TiO_2$ and $SiO_2$. The composition and structure of dielectric mirrors is well known to those skilled in the art.

The interior surfaces of transparent conductor 33 and dielectric mirror 75 are coated with alignment layers 80, 81 respectively. Alignment layers 80,81 facilitate the orientation of adjacent liquid crystal molecules. Organic or inorganic agents may provide the desired alignment. The composition and deposition of alignment layers is well known to those versed in the art. It is important to note that the deposition of alignment layers onto dielectric mirrors is often easier than deposition onto conductive electrodes. Also there may be spacing means (not shown) to keep the layers separated at a uniform distance. The spacing means could be at the edges of the cell, as an annular spacer, or dispersed within the cell as spherical spacers. The uniform topography of the dielectric mirror provides for considerable increase in the ability to create a uniform space between alignment layers 80,81.

A suitable liquid crystalline material 90 fills the space between alignment layers 80, 81. There are many appropriate liquid crystal compositions for use as polarization modulators. It will be obvious to persons skilled in the art that these results can be obtained using a positive dielectric anisotropy nematic liquid crystals operating in either an electrically tunable birefringence mode or a combined waveguiding and tuneable birefringence mode as in the hybrid field effect twisted nematic, a negative dielectric anisotropy nematic liquid crystal operating in an electrically tuneable birefringence mode, or a ferroelectric liquid crystal operating in either surface stabilized or non-surface stabilized modes. It is desirable that the liquid crystal operate at relatively low voltages to enable the use of low power, low voltage IC driver technology such as CMOS.

The important benefit of the present invention is the separation of functions of layers for creation of the field across the liquid crystal layer and layers for reflection of light. The electrode can be made highly conductive without being constrained by high reflectivity. The electrode does not have to be polished. The reflectivity of the dielectric mirror can be maximized without reference to the conductivity. This also provides possible cost reductions. Use of a dielectric mirror instead of a conductive reflector allows a system that does not need mechanical polishing and can be deposited with techniques well known to practitioners in the art. The dielectric mirror has an intrinsic 100% aperture ratio; the entire surface of the cell is reflective. This provides an enormous benefit over prior art in which the regions between the electrodes are non-reflective. The dielectric mirror is smooth and free of contrast reducing effects from roughness and topology.

The only limitation on aperture ratio is the regions which the electric field reaches. An additional effect used in the preferred embodiment is to increase aperture ratio with fringing fields. If the gaps between the electrodes is small or comparable compared to the thickness of the liquid crystal, fringing fields from the electrodes will either totally, or at least partially switch the liquid crystal which in the absence of fringing fields would be unswitched. The dielectric mirror reflects light uniformly from all areas.

Figure 2:
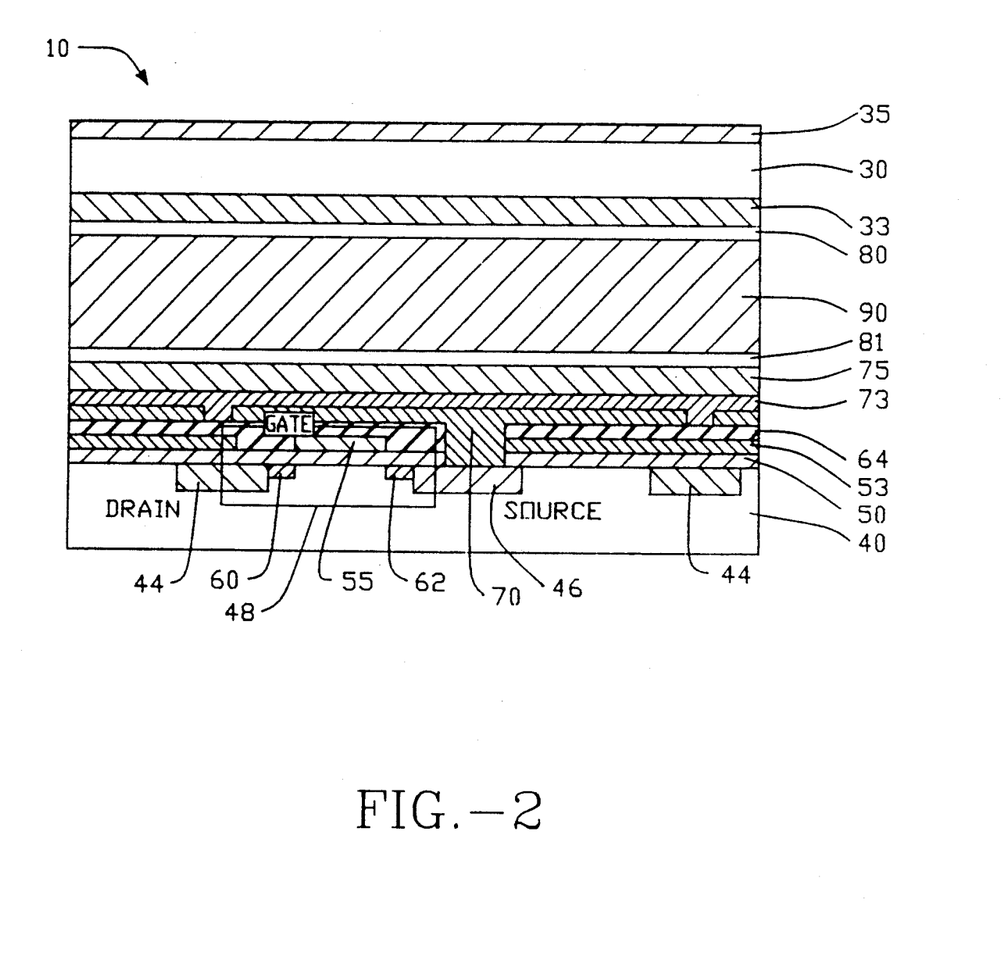
FIG. 2 is a cross section view of the region around a single pixel of the second embodiment of the present invention.

In the second embodiment, the liquid crystal material composition has a large enough intrinsic RC time constant (rho * epsilon greater than one frame time) that additional storage capacitors are not needed. In the first embodiment, capacitor layer 66 and insulator layer 68 are between the electrode 70 and the insulator layer 64. In the second embodiment, the use of liquid crystal compositions with high resistivity value to increase the device's intrinsic RC constant can eliminate the need for the capacitor. FIG. 2 is a side view schematic diagram of the second embodiment. Referring to FIG. 2, the second embodiment lacks capacitive layer 66 and insulator layer 68 found in the first embodiment. The lack of these layers provides a less complicated, less costly cell.

Figure 3:
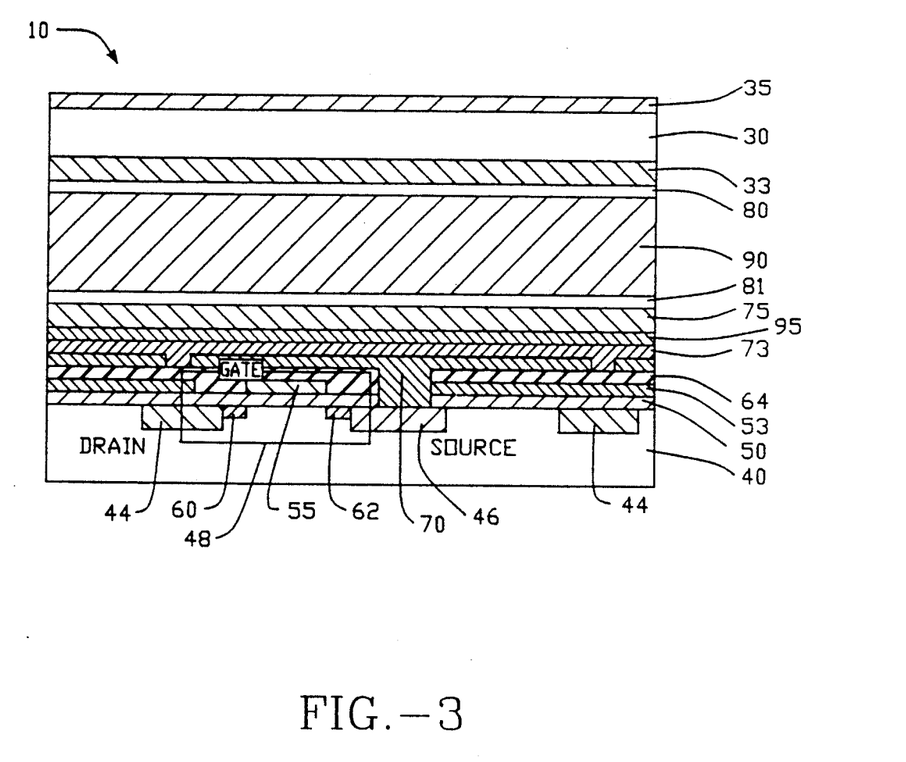
FIG. 3 is a cross section view of the region around a single pixel of the third embodiment of the present invention.

It is possible that light will leak through the dielectric mirror and other layers to activate the underlying light sensitive regions 44 and 46. Therefore a third embodiment is provided to prevent such occurrences. FIG. 3 is a schematic cross section view of the cell of the third embodiment. Referring to FIG. 3, light blocking layer 95 is disposed at some layer between the oxide layer 53 and the dielectric mirror 75, preferably adjacent to the dielectric mirror 75. Suitable light blocking layers are composed of plasma enhanced CVD deposited a-Si:Ge, light absorbing dye containing polyimides, and p-Si. Although FIG. 3 indicates a device lacking a capacitive structure, the third embodiment is not so limited. If a light blocking layer is used, the capacitive layer 66 would not have to be maximized as a light blocker in addition to a capacitor, possibly providing increased efficiency.

Figure 4A:
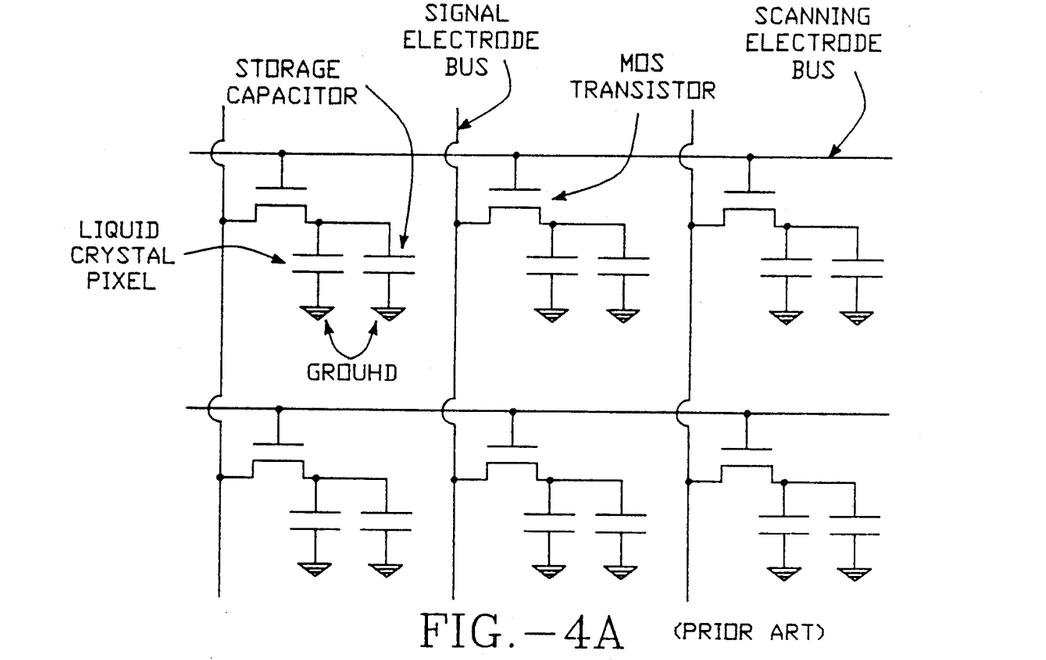
FIG. 4A is an equivalent circuit from the prior art.
Figure 4B:
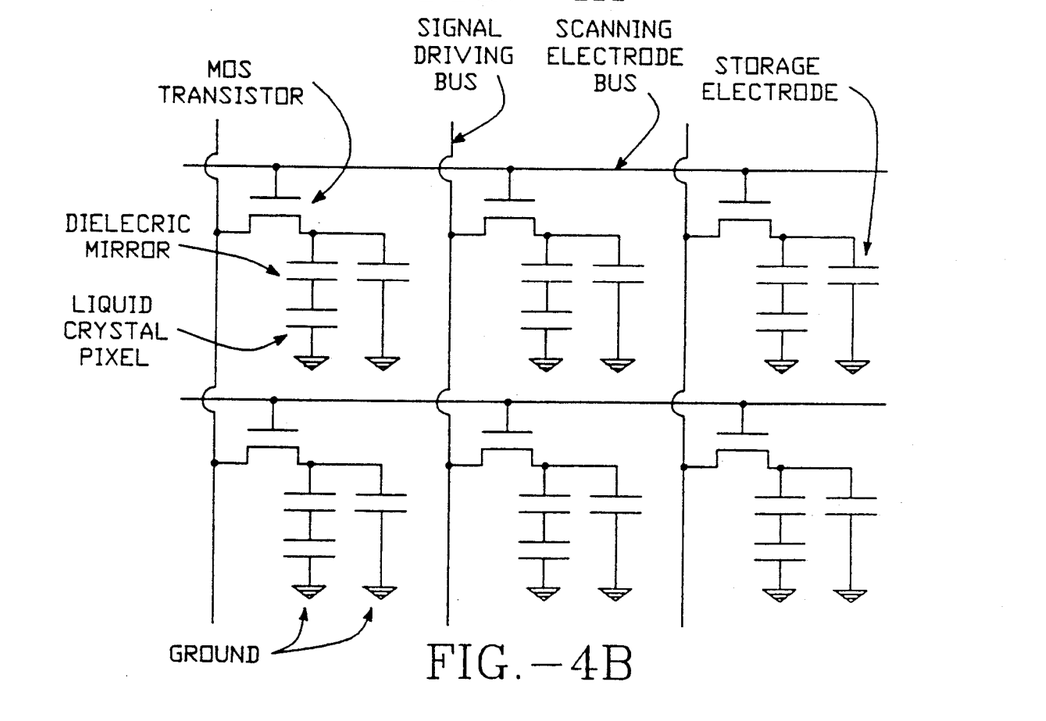
FIG. 4B is an equivalent circuit of the first embodiment of the present invention.
Figure 4C:
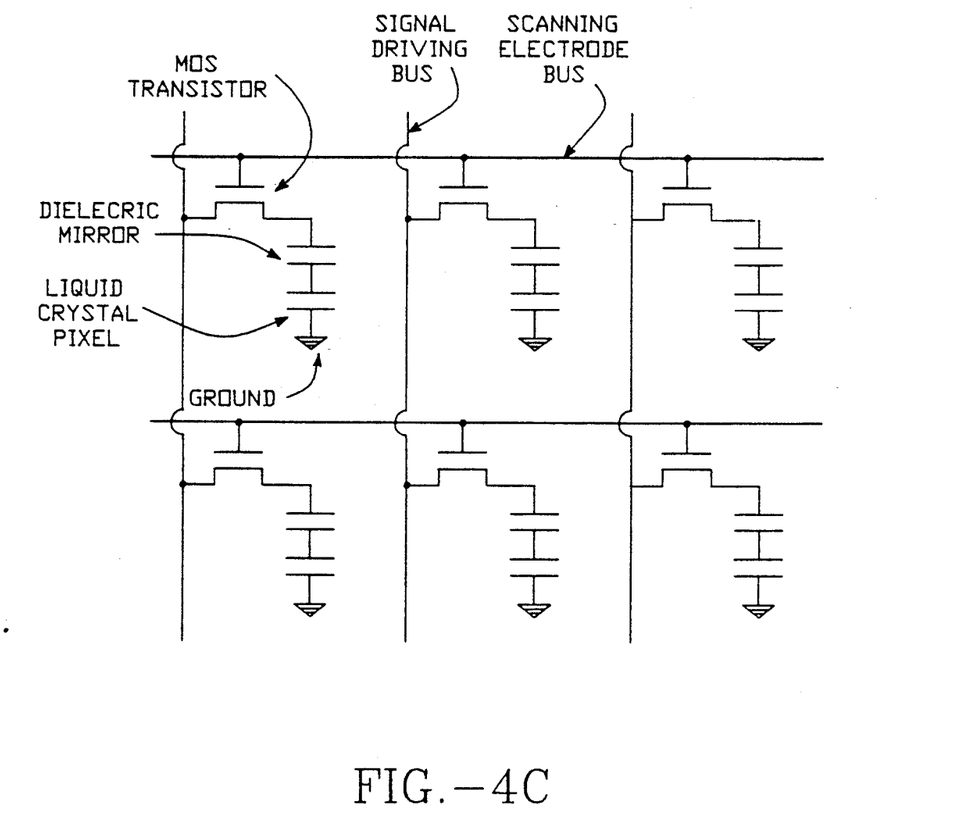
FIG. 4C is an equivalent circuit of the second embodiment of the present invention.

FIG. 4A is schematic diagram of the first approximation equivalent circuit of a prior art cell for use in comparison to the present invention. The gates of each row of the pixel addressing MOS transistors are tied to individual scanning electrode buses, as required for line-at-a-time scanning. In operation successive rows of transistors are turned on sequentially by pulses from the scanning electrode bus drivers. Simultaneously, appropriate picture signals are applied to the source electrodes by signal electrode bus drivers. FIG. 4B is the schematic diagram of the equivalent circuit of the first embodiment of the present invention. An additional capacitance has been added in series with that of the liquid crystal to account for the dielectric mirror and leveling layer. This impedance of the dielectric mirror must be small, otherwise significant voltage can be lost and a reduction in operating range follows. This is accomplished by keeping the thickness of the dielectric mirror and leveling layer relatively small compared to the liquid crystal layer. For this purpose it is also desirable to use relatively low dielectric constant liquid crystals. FIG. 4C is a schematic diagram of the equivalent circuit of the second embodiment of the present invention. There are no capacitors in parallel with the capacitors associated with the liquid crystalline material. As previously described, this is accomplished by the use of a liquid crystalline material with a high RC time constant.

Figure 5:
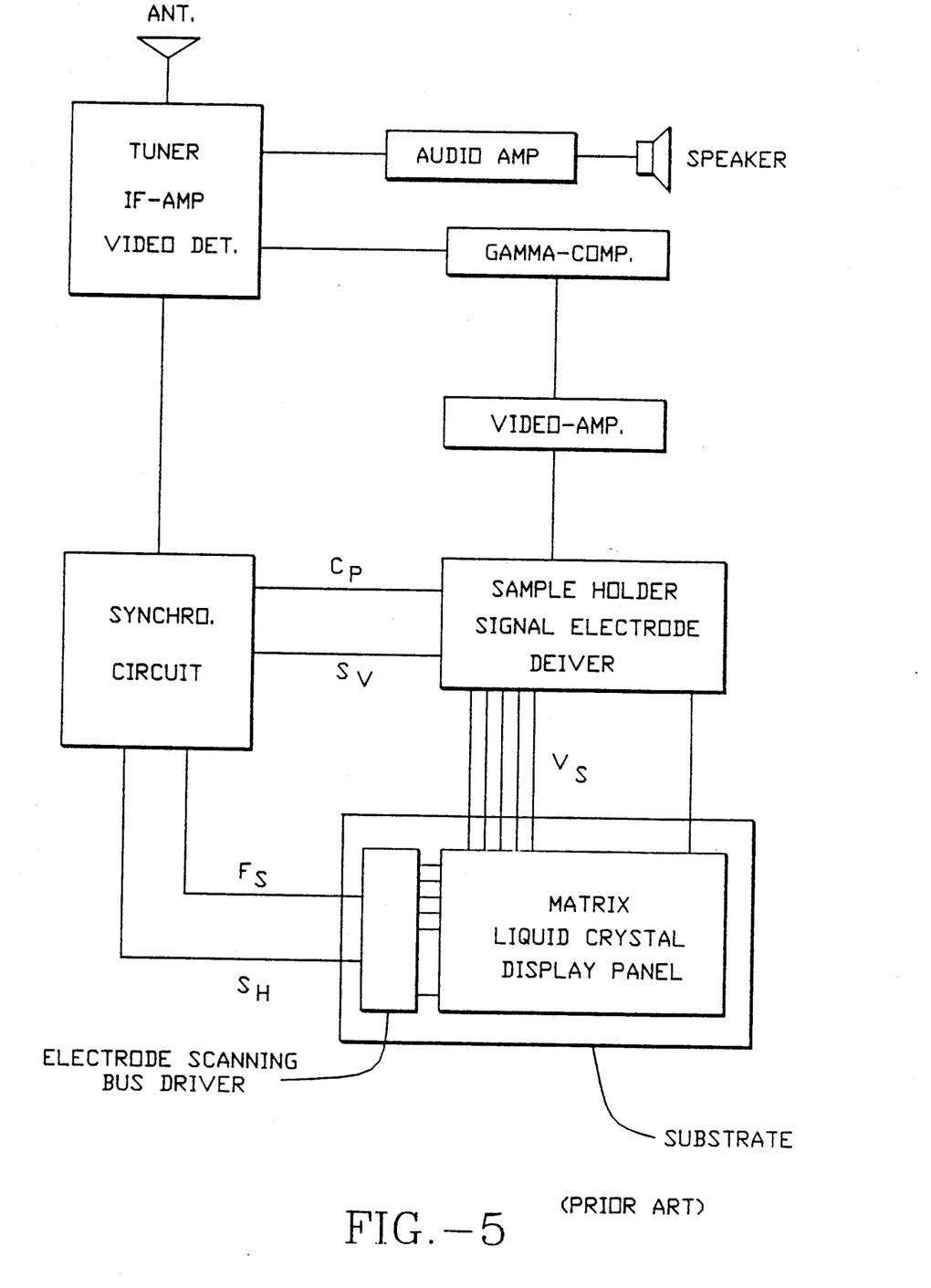
FIG. 5 is block diagram of an electronic circuit from the prior art useful for driving the matrix addressed light valve of the current invention.

Referring to FIG. 5, a block diagram of possible prior art TV display circuit is shown which could use the present invention. A video signal, from an antenna for example, enters a tuner. The audio portion is sent to an audio amp and speaker, the video portion is sent to a gamma compensation circuit. The signal from the gamma compensation circuit is amplified by video amp. The output signal is sampled at constant intervals and held by a holder circuit to produce the scanning line signal consisting of one individual picture signal per column which is fed to the signal electrode buses. One or more scanning electrode bus driver units provide the driving signal for the scanning electrodes. A synchronization signal coordinates the sampling, scanning driver, and signal driver. Preferably, the driving circuits are formed on the same silicon wafer as the addressing matrix.

Figure 6:
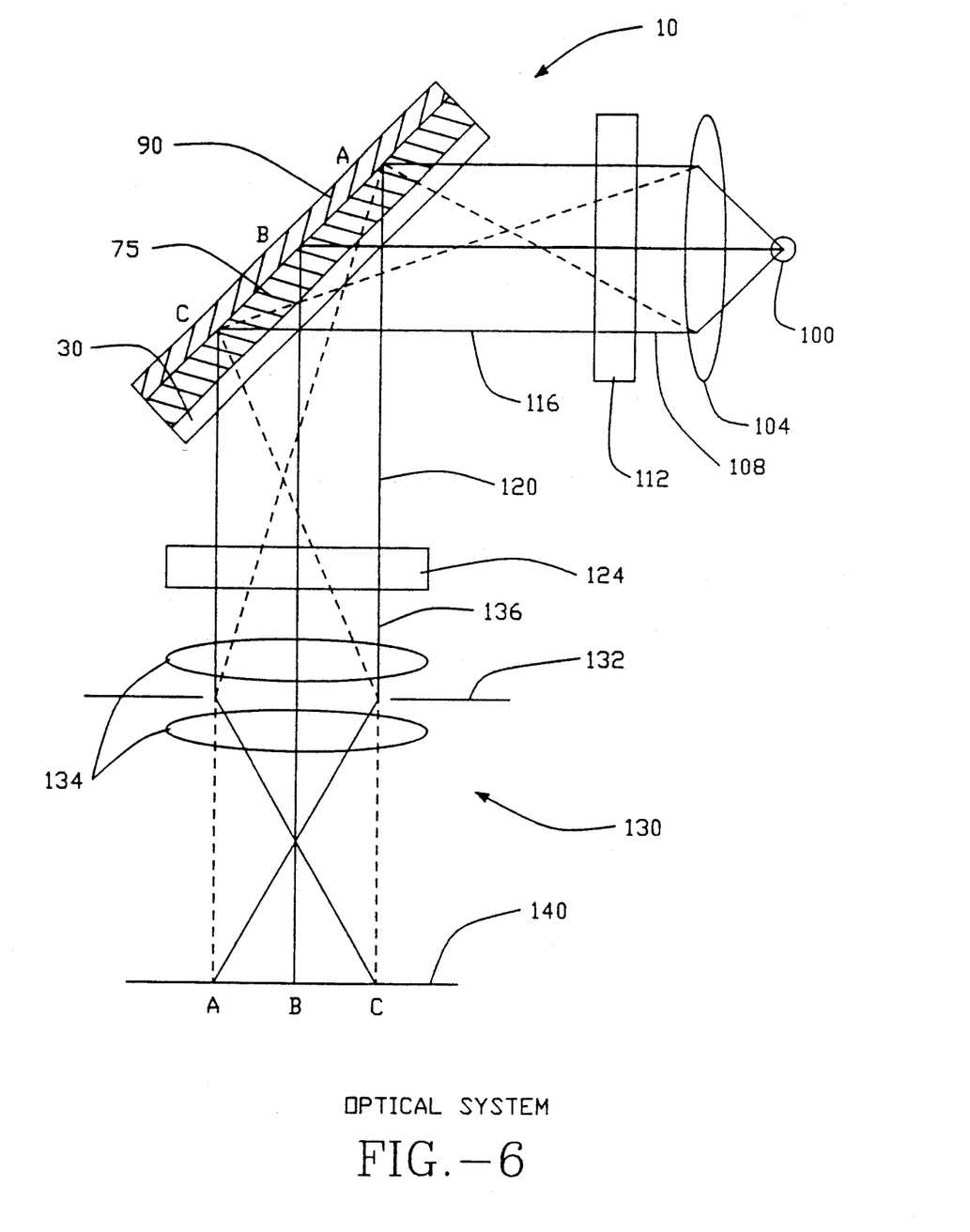
FIG. 6 is a schematic of an optical system which utilizes the present invention in a projection device.

FIG. 6 is a schematic diagram of a projection device using the present invention. High intensity light from light source 100 is partially collimated by collimating means 104. The resulting light beam 108 passes through polarization means 112, which produces a polarized light beam 116 of substantially one polarization. The polarizing means could produce linearly polarized light or circularly polarized light. Polarized light beam 116 strikes liquid crystal cell 10. The light passes through transparent glass substrate 30 and liquid crystal material 75. Polarized light beam 116 is reflected by dielectric mirror 75, passes back through liquid crystal 75, and out through transparent glass substrate 30. Where a voltage is applied across the liquid crystal material, the polarization of the beam 116 is altered, for example from right circularly polarized to left circularly polarized or from one linear polarization to an orthogonal linear polarization. The modulated light beam 120 passes through analyzer means 124 which filters out a certain polarization. Preferably the polarization filtered by analyzer means 124 is the same as that produced by polarizing means 112. The filtered beam 136 passes through projection means 130 which include imaging lenses 134 and limiting aperture 132. Projection means 130 projects the image onto a viewing screen 140. This off-axis projection system was shown for convenience of illustration, and does not limit the invention. Off-axis optics minimize the problems of ghost and retro-reflections. However, an on-axis optical projection system can also be used. On-axis optics minimize the effects of angular dependence of the electro-optical properties of the liquid crystal and enable the use, by methods well known to workers in the art, of combination of polarizer means and analyzer means into the same polarizing prism or mirror.

One benefit of using polarization mode cells rather than scattering mode cells is that the polarization cells are somewhat larger than scattering cells with similar light controlling capability. Consequently electrodes and busses can be larger, and therefore the device is less susceptible to parasitic effects. More importantly, the projection system utilizing polarization modulation provides considerable improvement in contrast ratio by reduction of interface reflections. There will always be a residual mismatch of the index of refraction at the glass and air interface and in the glass/ITO/liquid crystal interfaces, which result in light reflections. The prior art of Lloyd uses the scattering mode. When pixel voltage is low, light is not scattered by the liquid crystal and the corresponding pixel on the screen is bright. When the pixel voltage is high, light is scattered by the liquid crystal. This scattered light misses the limiting aperture of the projection means and the corresponding pixel on the screen appears dark. Consequently, light which is reflected off interfaces reaches the screen, reducing the contrast ratio. The same problem applies to other prior art liquid crystal modes of operation, such as nematic liquid crystals with appropriate pleochroic dyes, in which the application of a field changes the absorption of the liquid crystal. In the present invention, light which is reflected from the glass is unchanged in polarization, and is filtered by the analyzer means. It is possible to achieve greater than 100:1 discrimination with polarization optics.

What is claimed is:

1. A matrix addressed liquid crystal light valve device for reflection mode projection, comprising:
   a first substrate;
   a transparent second substrate positioned substantially parallel to and spaced apart from said first substrate;
   a transparent electrode means positioned proximate said transparent second substrate and between said first and second substrates;
   first alignment means positioned proximate said transparent electrode means;
   addressing active matrix supported by said first substrate, said addressing active matrix including an array of pixel electrodes;
   leveling means located adjacent said addressing active matrix to form a substantially planar surface;
   substantially nonconductive reflective means separate and distinct from said array of pixel electrodes, said reflective means formed as a continuous sheet on the substantially planar surface of said leveling means;
   second aligning means positioned proximate to said reflective means; and
   a layer of liquid crystal material positioned between said first and second aligning means.

2. The device of claim 1, wherein said reflective means is a dielectric mirror.

3. The device of claim 1, wherein said leveling means includes a light blocking means.

4. The device of claim 1, wherein said addressing active matrix includes
   a plurality of substantially parallel, equally spaced conductive first busses,
   a plurality of substantially parallel, equally spaced second busses, said second busses being substantially orthogonal and electrically insulated from said first busses, and
   a field effect transistor formed within each cell area defined by the intersection of an adjacent pair of first busses with an adjacent pair of second busses, one of said first busses and one of said second busses in electrical connection with said field effect transistor,
   each pixel electrode of said array of pixel electrodes overlying one of said field effect transistors and in electrical connection with said one of said field effect transistors.

5. The device of claim 1, wherein said addressing active matrix further comprises storage capacitor means.

6. The device of claim 5, wherein said storage capacitor means further comprises light blocking means.

7. The device of claim 1, wherein said liquid crystal material has a dielectric relaxation time greater than 15 ms.

8. The device of claim 1, wherein said liquid crystal material switches to full contrast ratio with less than 6 volts.

9. The device of claim 1, wherein said first substrate is a semiconducting substrate.

10. The device of claim 9, wherein said semiconducting substrate is a single crystal silicon wafer suitable for standard integrated circuit processes.

11. The device of claim 1, wherein the distance between adjacent pixel electrodes of said array of pixel electrodes is sufficiently small that the electric fields created by said pixel electrodes of said addressing active matrix have fringing fields which switch substantially all of the liquid crystal material including areas not directly over said pixel electrodes.

12. The device of claim 1, further comprising a plurality of matrix drivers which provide electrical signals to said addressing active matrix, at least a portion of said plurality of matrix drivers located on said first substrate.

13. The device of claim 11 wherein the distance between the adjacent pixel electrodes of said array of pixel electrodes is approximately equal to or less than the thickness of the layer of liquid crystal.

14. An active matrix addressed liquid crystal light valve device for reflection mode projection, comprising:
   a first substrate;
   a transparent second substrate positioned substantially parallel to and spaced apart from said first substrate;
   a transparent electrode means positioned proximate said transparent second substrate and between said first and second substrates;
   first alignment means positioned proximate said transparent first electrode;
   an addressing active matrix supported by said first substrate, said addressing active matrix including a plurality of substantially parallel, equally spaced conductive first busses, a plurality of substantially parallel, equally spaced conductive second busses, said first busses being substantially orthogonal and electrically insulated from said second busses, a field effect transistor formed within each cell area defined by the intersection of an adjacent pair of first busses with an adjacent pair of second busses, one of said first busses and one of said second busses in electrical connection with said first effect transistor, and an array of electrodes, each electrode of said array of electrodes overlying one of said field effect transistors and in electrical connection with said one of said field effect transistors;
   leveling means located adjacent said addressing active matrix to form a substantially planar surface;
   substantially nonconductive reflective means separate and distinct from the array of electrodes, said reflective means formed as a continuous sheet on the substantially planar surface of said leveling means;
   second aligning means positioned proximate to said reflective means; and
   a layer of liquid crystal material positioned between said first and second aligning means;
   the distance between adjacent electrodes of said array of electrodes being sufficiently small that the electric fields created by said electrodes of said addressing active matrix have fringing fields which switch substantially all of the liquid crystal material including areas not directly over said electrodes.

15. In a matrix addressed device, the structure comprising:
   first and second substrates;
   a layer of liquid crystal material positioned between said first and second substrates;
   an addressing active matrix supported by said first substrate, said addressing active matrix including an array of electrodes;

a leveling layer disposed on said addressing active matrix to provide a substantially planar surface; and a substantially nonconductive reflective means separate and distinct from said array of electrodes, disposed as a continuous layer upon the planar surface of said leveling layer.

16. An matrix addressed liquid crystal light valve device, comprising:

first and second substrates;

a layer of liquid crystal material having a thickness positioned between said first and second substrates; and means for applying electric fields across said layer of liquid crystal material in order to switch the liquid crystal material, said applying means including an array of spaced apart electrodes, adjacent electrodes of said array of electrodes having a distance therebetween;

said layer of liquid crystal material having a first region directly over said electrodes and a second region directly over the spaces between said adjacent electrodes;

the distance between adjacent electrodes of said array of electrodes being sufficiently small that the electric fields which switch the liquid crystal material in said first region have fringing fields which switch substantially all of the liquid crystal material in said second region.

17. The device of claim 16 wherein said device further comprises light reflective means located between said first and second substrates.

18. The device of claim 16 wherein the distance between adjacent electrodes of said array of electrodes is approximately equal to or less than the thickness of the layer of liquid crystal material.

19. In a matrix addressed liquid crystal light valve device including a layer of liquid crystal material, means for applying electric fields across said layer of liquid crystal material to change the molecular configuration of the layer of liquid crystal material, and an addressing active matrix structure positioned on one side of said layer of liquid crystal material for controlling the operation of said electric field applying means, the improvement comprising:

an array of spaced-apart pixel electrodes forming part of said addressing active matrix and serving as part of said means for applying an electric field, said pixel electrodes being positioned sufficiently close to one another so as to result in fringing fields across the liquid crystal material disposed over the areas between the pixel electrodes, to change the molecular configuration of the liquid crystal material in the areas between the pixel electrodes so that light passing through said areas is affected by the liquid crystal material in a similar manner to light passing through the areas over the nearest adjacent pixel electrode.

20. In a matrix addressed liquid crystal light valve device including a layer of liquid crystal material having a light receiving side and a reflector facing side, means for applying an electric field across said layer of liquid crystal material to change the molecular configuration of said layer of liquid crystal material and thereby affect light passing therethrough, and an addressing active matrix positioned on the reflector facing side of said layer of liquid crystal material for controlling the operation of said electric field applying means, the improvement comprising:

a continuous substantially nonconductive layer having a light reflecting surface separate and distinct from both said addressing active matrix and said means for applying an electric field and located on the reflector facing side of said layer of liquid crystal material with its light reflecting surface facing said liquid crystal material, said non-conductive layer serving as a light reflecting means; and an array of spaced-apart pixel electrodes forming part of said addressing active matrix and serving as part of said means for applying an electric field, said pixel electrodes being positioned sufficiently close to one another so as to result in fringing fields across the liquid crystal material disposed over the areas between the pixel electrodes to change the molecular configuration of the liquid crystal material in the areas between pixel electrodes so that light passing through said areas is affected by the liquid crystal material in a similar manner to light passing through the areas above the nearest adjacent pixel electrode.

21. In a matrix addressed device, the structure comprising:

first and second substrates;

a layer of liquid crystal material positioned between said first and second substrates;

an addressing matrix including an array of spaced apart electrodes, said addressing matrix supported by said first substrate to define a non-planar surface;

leveling means disposed on said non-planar surface to provide a substantially planar surface; and a substantially nonconductive reflective means separate and distinct from said addressing matrix, disposed as a continuous layer upon said planar surface.

* * * * *